March 19, 1974 R. C. NOYES 3,798,124
FUEL SUBASSEMBLY FOR NUCLEAR REACTOR
Filed May 27, 1969

INVENTOR.
RICHARD C. NOYES
BY
Roland A. Anderson

United States Patent Office 3,798,124
Patented Mar. 19, 1974

3,798,124
FUEL SUBASSEMBLY FOR NUCLEAR REACTOR
Richard C. Noyes, Hartford, Conn., assignor to the United States of America as represented by the United States Atomic Energy Commission
Filed May 27, 1969, Ser. No. 828,269
Int. Cl. G21c 3/06, 3/32
U.S. Cl. 176—76                                       4 Claims

ABSTRACT OF THE DISCLOSURE

A circular cylinder nuclear fuel subassembly having extended circumferentially spaced containers of moderating material along the outer periphery to permit a plurality of subassemblies to be assembled in contact with each other and the containers occupying the spaces between the subassemblies.

BACKGROUND OF THE INVENTION

The invention described herein was made in the course of, or under a contract with the United States Atomic Energy Commission.

In the design of a fast spectrum nuclear reactor it is essential for reasons of safety that a substantial negative Doppler effect be present, that is, reactivity should tend to decline with increases in power to prevent a runaway situation from developing.

One of the ways by which this can be accomplished is the addition of a moderating material such as beryllium oxide to the core of the reactor. Conventionally, this involves a typical construction of replacing some of the fuel pins, that is a portion of the fuel, with moderator pins or the like.

The conventional accomplishment of this purpose described above has the disadvantages of affecting adversely the plutonium breeding efficiency of the reactor, the fuel costs of the system and of reducing the space available for fuel in the core.

SUMMARY OF THE INVENTION

The present invention avoids the disadvantages and difficulties involved in conventional ways of obtaining a substantial negative Doppler effect in a fast spectrum nuclear reactor by adding the moderator material in a way that requires less structural material and the removal of less fuel.

In accordance with this invention, in a preferred embodiment, circular fuel assemblies instead of hexagonal or square assemblies are utilized in the core so that a thinner walled shroud can be used and so that spaces between fuel assemblies are created in which the moderator may be situated when mounted on the outer circumferences of the fuel subassemblies.

As a result of this construction, a thin walled shroud can be used because the circular geometry is structurally more efficient than a square or hexagon in resisting internal pressure. This thin shroud wall reduces the amount of steel in the core thus improving neutron economy. The thin shroud wall also allows subassemblies to be placed closer together resulting in a higher relative fraction of space available for fuel. The net effect of this construction thus is to improve the neutron economy relative to a conventional solution by reducing the structural material and increasing the fuel material in the core. Placement of the refractory moderator along the perimeter of the shroud also improves the capability of the subassembly shroud to resist attack by molten fuel in the event of an accident.

It is thus a principal object of this invention to provide a nuclear fuel subassembly with more effective and efficient provision for obtaining a substantial negative Doppler effect.

Other objects and advantages of this invention will hereinafter become obvious from the following description of at least one preferred embodiment of this invention.

DESCRIPTION OF THE PREFERRED EMBODIMENT

Figure 1:
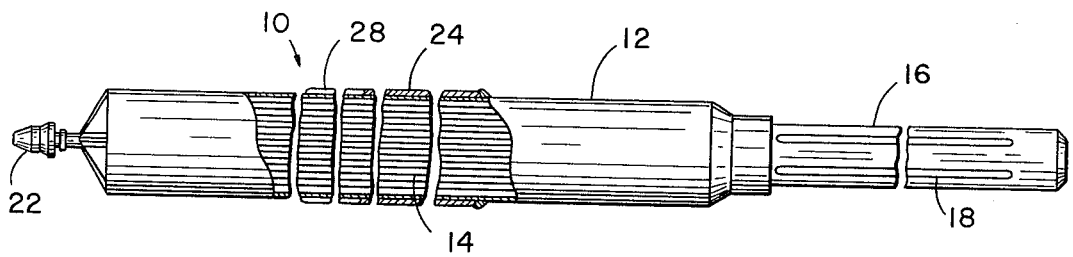
FIG. 1 is an elevation view in partial section of a preferred embodiment of this invention.
Figure 2:
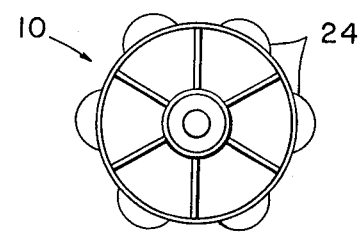
FIG. 2 is a left side view of the subassembly shown in FIG. 1.

Referring to FIGS. 1 and 2, circular fuel subassembly 10 consists of a cylindrical shroud 12 containing a plurality of fuel pins 14, an inlet nozzle section 16 containing inlet slots 18, and a handling head 22. Along the outer circumference of shroud 12 are a plurality of extended shells or containers 24 for containing suitable moderator material 26 or a burnable poison. Shells 24 are in cross-section segments of a circular cylinder and extend axially along the outer surface of shroud 12 parallel to the axis of subassembly 10. Shells 24 are spaced circumferentially for a purpose described below, and may be welded in place as shown. The upper portion of each shell 24 is provided with a vent 28 to provide a controlled path for escape of helium gas generated in the beryllium oxide as a result of neutron induced reactions.

Figure 3:
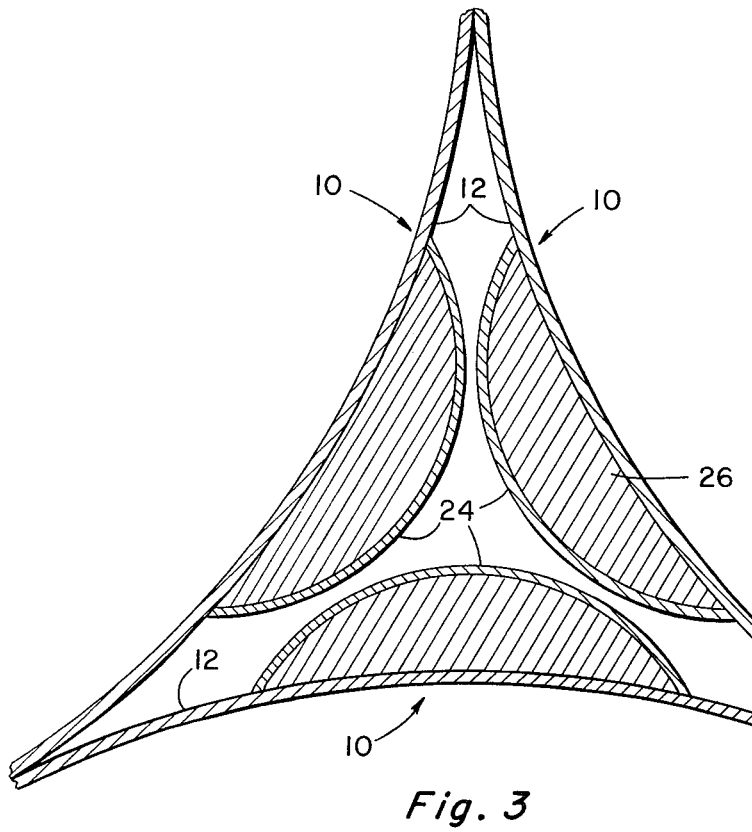
FIG. 3 shows a partial array in sections of a few of the subassemblies of this invention illustrating the disposition of the moderating material in the core of a reactor.

With reference to FIG. 3, it is seen that when fuel subassemblies 10 are in place in the core of a reactor, the spces between adjacent subassemblies are occupied in part by moderator shells 24, due to the circumferential spacing of the latter, thereby avoiding the substitution within subassemblies 10 any of the fuel pins with moderator.

The advantages of this construction over that of a conventional hexagonal arrangement are illustrated in the following table.

TABLE.—COMPARISON OF ALTERNATE MODERATOR ARRANGEMENTS

| Arrangement | Hexagonal subassembly with solid shroud and 19 moderator pins | Circular subassembly |
|---|---|---|
| Volume fractions: | | |
| Fuel | 0.355 | 0.386 |
| Sodium | 0.407 | 0.432 |
| Steel | 0.189 | 0.137 |
| BeO moderator (percent density) | 0.049 (77) | 0.045 (77) |
| Voided Doppler (T dk/dt) | −0.004 | −0.004 |
| Fuel cycle cost change (mills/kwh.)[1] | +0.15 | +0.06 |
| Doubling time change (years)[1] | +1.4 | +0.6 |

[1] Relative to unmoderated core.

It is thus seen that there has been provided an improved fuel subassembly for a fast spectrum nuclear reactor capable of producing a substantial negative Doppler effect.

While only a preferred embodiment has been described and illustrated it is understood that many variations of this invention thereof are possible as defined in the following claims.

What is claimed is:

1. In an arrangement of nuclear subassemblies for a fast nuclear reactor, each subassembly consisting of a plurality of generally parallel and elongated shrouds, the circumference of each of said shrouds surrounding and containing a plurality of nuclear fuel pins, each of the shrouds having a generally cylindrical outer surface and arranged in said subassembly so that each shroud contacts at least two other shrouds substantially along the length of the outer surfaces thereof; the improvement wherein said contacting shrouds define an elongated region bounded and enclosed by the cylindrical outer surfaces of at least three contacting shrouds, and at least one container extending axially along and secured on the circumference of each of said outer shroud surfaces defining said region, the containers within one of said regions being not in contact one with another and each container containing a neutron moderating material, said region occupied only in part by said container whereby a coolant can flow through each fuel containing shroud and each region.

2. The subassemblies defined in claim 1, wherein said containers have a portion along the length unoccupied by moderating material whereby said unoccupied portion of the containers form a vent to provide a controlled path for escape of gasses generated within the moderator of each of said containers.

3. The subassemblies defined in claim 1, wherein said containers are in the form of radial segments of a elongated circular cylinder.

4. The subassemblies defined in claim 1, wherein said container neutron moderating material is beryllium oxide.

References Cited
UNITED STATES PATENTS

| | | | |
|---|---|---|---|
| 2,907,705 | 10/1959 | Blainey | 176—81 X |
| 2,941,933 | 6/1960 | Roake et al. | 204—154.2 |
| 2,985,575 | 5/1961 | Dennis et al. | 176—81 X |
| 3,033,773 | 5/1962 | Schluderberg et al. | 176—92 X |
| 3,163,584 | 12/1964 | Roche et al. | 176—78 X |
| 3,215,606 | 11/1965 | Silvester | 176—71 X |
| 3,274,068 | 9/1966 | Koutz et al. | 176—71 X |
| 3,284,315 | 11/1966 | Thome | 176—91 X |
| 3,314,859 | 4/1967 | Anthony | 176—50 |
| 3,629,061 | 12/1971 | Noyes et al. | 176—71 X |

CARL D. QUARFORTH, Primary Examiner

R. S. GAITHER, Assistant Examiner

U.S. Cl. X.R.

176—71, 78, 90